Aug. 18, 1970     J. W. ERICKSON     3,525,001
LIQUID COOLED ELECTRIC MOTOR
Filed Sept. 23, 1968     3 Sheets-Sheet 2
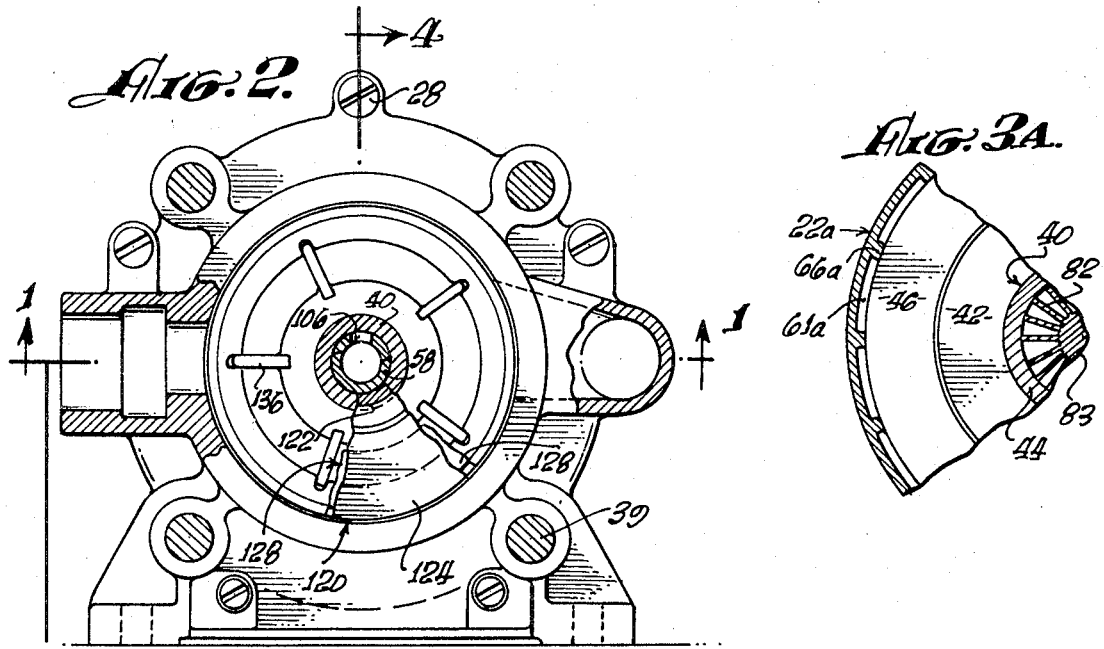
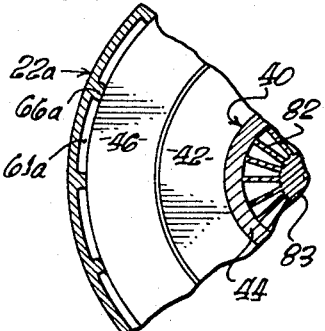
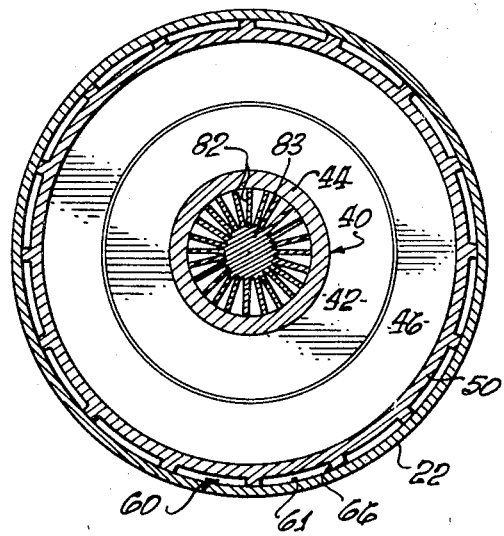
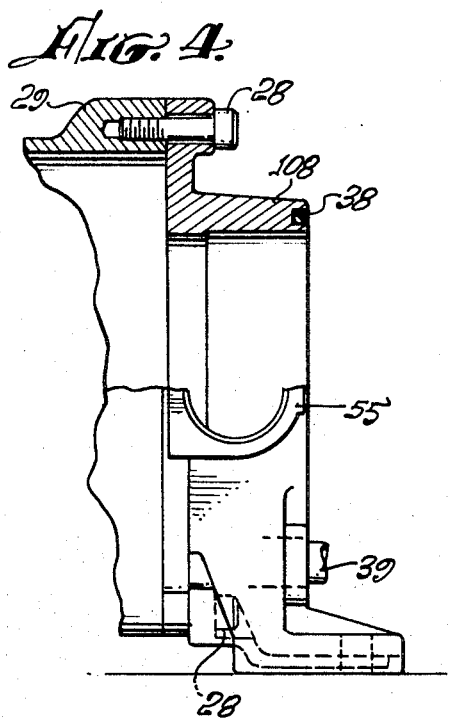
INVENTOR
JOHN W. ERICKSON,
By Charlton M. Lewis

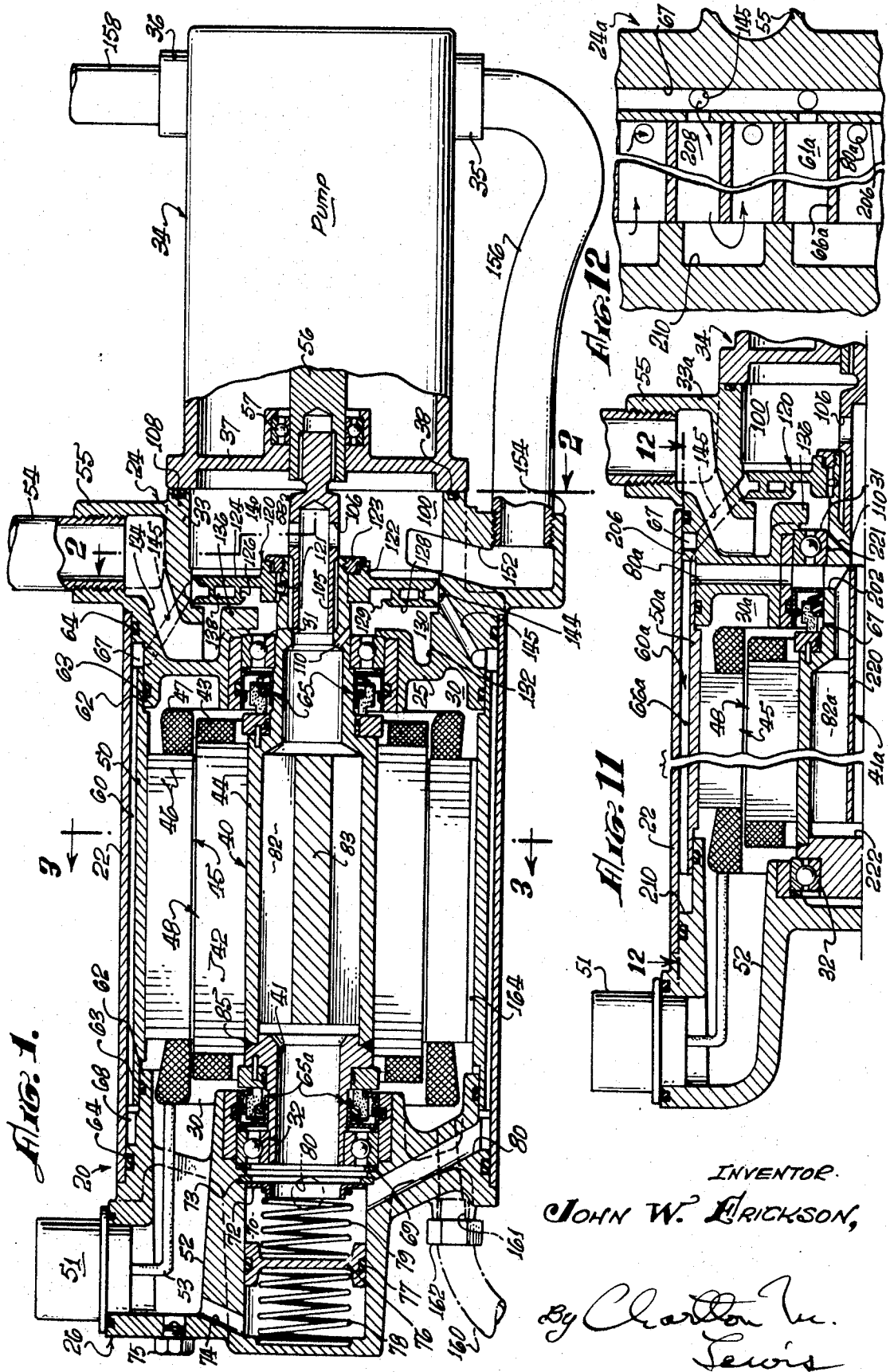

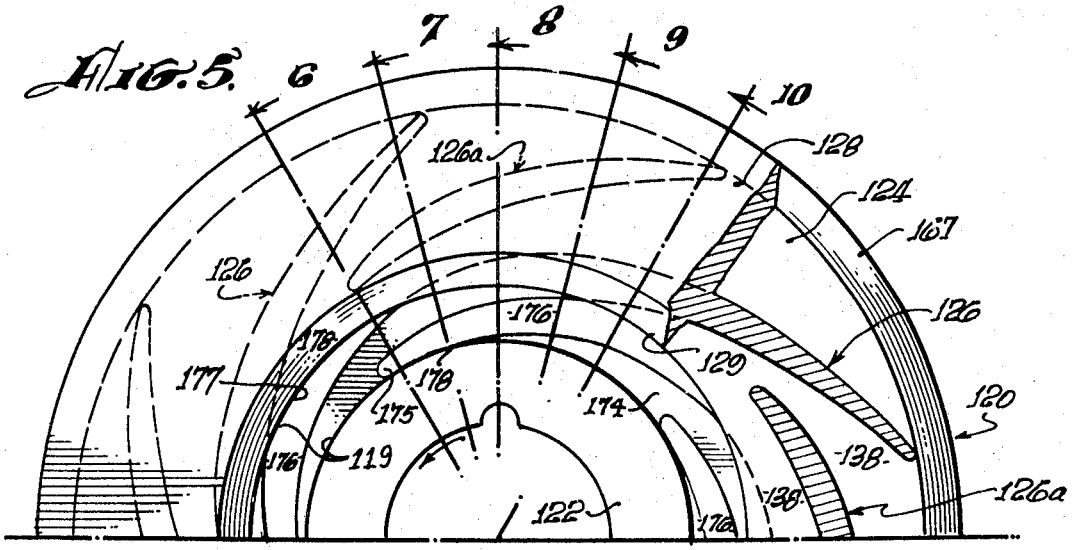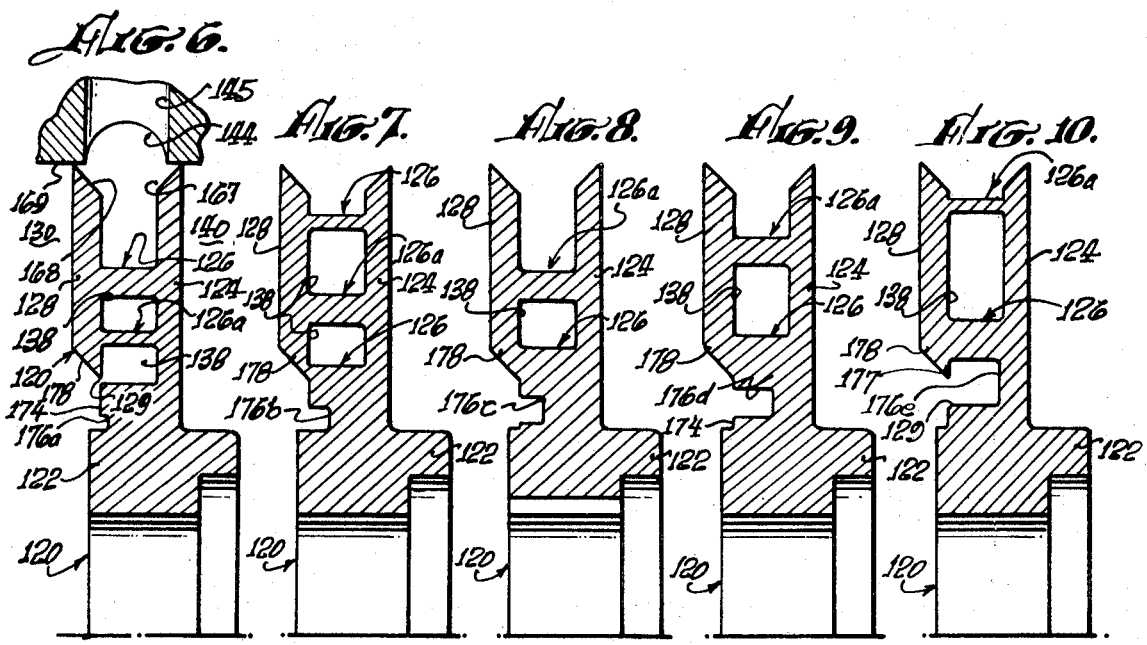

United States Patent Office 3,525,001
Patented Aug. 18, 1970

3,525,001
LIQUID COOLED ELECTRIC MOTOR
John W. Erickson, Huntington Beach, Calif., assignor to Preco, Inc., Los Angeles, Calif., a corporation of California
Filed Sept. 23, 1968, Ser. No. 761,769
Int. Cl. H02k 9/19
U.S. Cl. 310—54                     5 Claims

ABSTRACT OF THE DISCLOSURE

An electric motor for driving a hydraulic pump or the like is cooled by passing the entire flow of liquid through cooling passages in the motor. The input liquid is initially pressurized by a forepump, eliminating vaporization from local heating and delivering the liquid to the main pump at a pressure that reduces cavitation problems. The rotor and stator are immersed in a trapped liquid of low viscosity with pressure equalization to reduce leakage at the live seals. Vane structure is described for the forepump with an axial ramp at the inlet which allows hot liquids to be pumped at very low inlet pressures without loss of flow or capacity due to cavitation.

---

This invention has to do generally with the cooling of dynamoelectric machines such as motors by circulation of liquid in heat exchanging relation with their stator and rotor assemblies.

The invention is particularly useful in the cooling of electric motors used for driving liquid pumps, as for pressurizing hydraulic fluid and the like.

In accordance with one aspect of the invention, the entire liquid flow to the main pump is caused to pass in heat exchanging relation through passages suitably formed in the motor, thus removing heat at the required rate with relatively little elevation of the temperature of the circulated liquid. Vaporization due to local heating is thereby brought under control. One form of structure requires only one live seal.

A further aspect of the invention provides a forepump integrated in the motor structure for pressurizing the input liquid prior to circulation through the motor and prior to delivery to the main pump. Such initial pressurization further reduces any tendency toward liquid vaporization within the motor, and reduces the possibility of cavitation in the main pump. That latter function is especially important in aircraft applications as protection in case the normal high altitude pressurization of the main pump should fail. A small bypass insures circulation of all times.

The invention further includes specific forepump structure for reducing any tendency to cavitation even at very low inlet pressures. For that purpose the impeller is designed with an axial ramp and very low angle of lift at the inlet. The net positive suction head is further reduced by supplying liquid radially to the impeller inlet and providing a sharp cutoff at the inlet.

In accordance with a further aspect of the invention, the motor chamber, including rotor and stator assemblies, is filled wth a captive liquid having relatively low viscosity, especially at normal or abnormally low temperatures, greatly improving operating characteristics at start-up. A liquid impermeable, pressure equalizing mechanism is provided between the motor chamber and the cooling passages of the motor through which the hydraulic or other pumped liquid is circulated, virtually eliminating leakage across the live seals of the motor. The motor bearings are typically bathed with the hydraulic fluid, which is an effective lubricant. When maximum cooling of the motor windings is not required, the motor chamber may be filled with air instead of liquid, typically at atmospheric pressure so that no equalizing chamber is needed.

The invention further provides structural features, to be more fully described, which promote economy of construction and efficiency and reliability of operation.

Further objects and advantages of the invention will be understood from the following description, with reference to the accompanying drawings, in which:

FIG. 1 is an axial section on line 1—1 of FIG. 2 representing an illustrative embodiment of the invention;

FIG. 2 is a section, generally on line 2—2 of FIG. 1 and partially broken away;

FIG. 3 is a section on line 3—3 of FIG. 1;

FIG. 3A is a section but representing a modification;

FIG. 4 is a fragmentary section on line 4—4 of FIG. 2;

FIG. 5 is an elevation of the impeller in aspect opposite to FIG. 2;

FIGS. 6 through 10 are axial sections on the corresponding lines of FIG. 5;

FIG. 11 is a section similar to FIG. 1, but representing a modification; and

FIG. 12 is a developed fragmentary section on line 12—12 of FIG. 1.

The illustrative motor shown in the drawings is enclosed in a housing 20 which comprises the cylindrical shell 22, the inner end casting 24 and the outer end casting 26. The end castings are secured to shell 22 by the screws 28, which enter bosses 29, secured as by welding to the outer periphery of the shell (FIG. 4). The inner and outer end castings include the end walls 25 and 27, respectively, which enclose the motor chamber 30 and carry the inner and outer bearings 31 and 32 by which the shaft 40 is journaled. That shaft contains an axial bore 41 extending its entire length and opening through end walls 25 and 27 at the respective ends of motor chamber 30.

The present motor is specifically designed to drive a pump for supplying a liquid, typically a hydraulic fluid, at high pressure, as for operating hydraulic equipment on an aircraft, for example. Such a pump may be of any suitable type and is therefore indicated only schematically at 34 in FIG. 1, with pump inlet at 35 and pump outlet for pressurized liquid at 36. The pump housing typically includes an end wall 37 with flange structure adapted to engage positively the inner end of motor housing 20, to which it is connected by the bolts 39 (FIGS. 2 and 4) with suitable fluid seal 38. The pump shaft, indicated at 56 is journaled on the bearing 57, carried by housing wall 37, and on one or more other bearings, not shown. Pump shaft 56 is coupled to motor shaft 40 by the coupling element 58, which typically has splined engagement with both the shafts. Liquid at low pressure is supplied to the motor-pump assembly via the inlet conduit 54 and the fitting 55 in the motor housing. Before reaching the pump inlet, the entire body of that liquid is employed for cooling the motor, as will be more fully described.

The motor proper comprises the rotor 48 and the stator 45. The rotor laminations 42 are fixedly mounted on the central section 44 of motor shaft 40 within motor chamber 30, and carry the rotor windings 43. The stator laminations 46 are rigidly mounted within the stator shell 50, with stator winding 47. Electrical connections to stator windings 47 are indicated at 53 and extend axially outwardly through the conductor passage 52 in outer end casting 26 to the fluid tight electrical connector indicated at 51. Motor chamber 30 is sealed at bearings 31 and 32 where the motor shaft passes through end walls 25 and 27 by the live seals indicated at 67 and 68, which may be of conventional construction. As shown, the seals are placed axially inward of the respective bearings, so that the bearings are excluded from motor chamber 30.

Outer end casing 26 forms the cylindrical pressure equalizing chamber 70 which is typically coaxial with shaft 40 and opens at its inner end directly to shaft bore 41. The axially outer portion of chamber 70 is connected via the passage 74 to conductor passage 52 and thereby to the main body of motor chamber 30. The inner and outer portions of chamber 70 are separated by the piston 76, which is freely slidable in the cylindrical chamber with conventional sealing means 77. The piston is normally maintained in an axially central position in chamber 70 by the opposing forces of the outer coil spring 78 and the inner coil spring 79. The inner end of the latter is supported on the seating ring 72, positioned by the snap ring 73. Springs 78 and 79 are relatively soft, permitting substantially free piston movement to equalize the liquid pressure in motor chamber 30 and in the cooling passages to be more fully described.

The entire interior of motor chamber 30, passages 52 and 74, and the axially outer portion of temperature compensation chamber 70 are filled with a suitable liquid having the characteristics of relatively low viscosity, especially at low temperatures, freedom from corrosion, high dielectric constant and appreciable heat capacity. Silicone oils are particularly satisfactory for that purpose, the grade that is available commercially under the trade designation Dow Corning 200 Fluid being illustrative. A filling port with removable plug may be provided in end casting 26, for example, as indicated at 75.

Passages for circulation of heat absorbing liquid are provided in intimate heat exchanging relation with the stator assembly and with the rotor assembly. Stator shell 50 is spaced inwardly from housing shell 22, defining between them an annular cooling passage structure 60 which typically surrounds the entire periphery of motor chamber 30 and is separated from stator laminations 46 only by the relatively thin wall of the stator shell. Seals are provided at 63 between stator shell 50 and end casting flanges 62, and at 64 between housing shell 22 and the outer peripheries of the end castings.

Passage structure 60 may provide a continuous annular passage, but preferably is divided by radial fins 66 into a plurality of parallel subpassages 61, as shown best in FIG. 3. Uniform distribution of circulated liquid among those subpassages is assured by the annular header channels 67 and 68 at the ends of shell 50. Shell 50 and fins 66 are typically constructed as a unitary extrusion of a metal having high heat conductivity, such as aluminum, for example. That extrusion is shrunk into housing shell 22. Stator laminations 46 may be inserted in shell 50 with a shrink fit which insures good thermal contact. Thermal expansion between rotor and stator assemblies is accommodated by sliding of bearing 32 in end casting 26 under tension of the spring 69. The described structure permits the surfaces of shell 22 to contribute effectively to cooling of the circulated liquid.

Passage structure 60 is connected via the generally radial passages 80 to pressure equalizing chamber 70 inward of piston 76 and thence to shaft bore 41. That bore extends the entire length of shaft 40 and opens into the outlet chamber 100, to be more fully described. Shaft 40 is preferably constructed as shown, with a central portion 44 of relatively large diameter and small wall thickness, and with smaller end sections at bearings 31 and 32. Shaft section 44, on which rotor laminations 42 are mounted, is provided with the heat conducting fins 82, shown best in FIG. 3. Those fins are preferably formed as radial extensions from an axial rod 83, the rod and fins comprising an integral extrusion of aluminum or similar metal of high heat conductivity. The fins are dimensioned to permit the fin assembly to be shrunk into the bore of shaft section 44, providing good heat contact with the rotor laminations. Shaft 40 is constructed of two sections, joined as by welding at 85 after insertion of the fin assembly. The described fin structures, both in annular passages 60 and in the shaft bore, are carefully designed to provide maximum heat transfer to the circulated liquid with minimum obstruction to the liquid flow.

Inner end casting 24 of the motor housing includes the generally cylindrical shell portion 33 which extends axially from end wall 25 and carries main pump 34. Shell 33, end wall 25 and pump end wall 37 define the chamber 100. At least the end of that chamber adjacent the motor is cylindrical in form and receives the forepump impeller, designated generally by the numeral 120. The impeller is rigidly mounted on the end of motor shaft 40 by the retaining nut 123 and the defining ball 121. Impeller 120 comprises the hub 122 and the circular plate 124 which carries on its axially outer face the spirally formed pump vanes 126. Impeller 120 also includes the annular cover plate 128, typically cast integrally with vanes 126 and defining with those vanes and plate 124 the intervane passages 138 through which liquid is pumped centrifugally by pump rotation. Liquid enters those passages at their radially inner ends through the pump orifice 129 between hub 122 and annular cover plate 128 and leaves at the periphery of the impeller.

Plate 124 and cover 128 of impeller 120 fit with minimum clearance within chamber 100, so that the impeller effectively divides that chamber into the inlet chamber 130 and the outlet chamber 140. Liquid is supplied to inlet chamber 130 from conduit 54 via the generally radial passage 134, formed integrally in end casting 124. The outer periphery of chamber 130 is somewhat enlarged at 132 to receive and distribute that entering liquid, which then flows inward between the radial directing vanes 136 and arrives at pump orifice 129 with little or no circumferential velocity.

Liquid is delivered from pump passages 138 at elevated pressure and is received in the annular channel 144. It is delivered from that channel through multiple passages 145 in casting 24 to the axially inner end of annular passage structure 60, already described. After absorbing heat from the stator, the liquid flows through the passages 80 in outer end casting 26 to the inner end of temperature compensating chamber 70, and thence axially within shaft 40 the entire length of that shaft. Liquid is delivered from the inner end of shaft 40 through a bore 105 in coupling 54 and thence through radial apertures 106 to outlet chamber 140. Chamber 140 communicates via the passage 152 with the outlet fitting 154 and the conduit 156, which delivers the liquid directly to inlet 35 of main pump 34. After pressurization in pump 34 the liquid is supplied from pump outlet 36 via the conduit 158 to any desired device for utilizing the pressurized fluid. If the present motor structure is used with a main pump having its inlet and mounting structure at the same end, conduit 156 may be omitted, and the liquid delivered directly from chamber 140 through pump end wall 37 to the pump inlet.

For some applications the additional cooling provided by the liquid in motor chamber 30 is not required, and it may then be preferred to have that chamber filled with air. For that purpose a drain opening from the motor chamber is provided at 161. That opening may be closed by a plug 162, as shown in solid lines, or may have connected to it a drain conduit 160, shown in dot-dash lines. The stator laminations 42 are notched to provide the drain passage 164 between the two ends of the motor chamber. Conduit 160 may lead overboard or to a suitable reservoir for collecting any liquid that may seep into the motor chamber past the described seals.

The bypass passage 110 in shaft 40 returns a small fraction such as 1/10 of the pressurized liquid to the forepump inlet, insuring active circulation even if the main pump flow is temporarily interrupted.

A further advantage of the described structure is the ease with which it can be converted to operation with a single coolant liquid for applications where use of a separate liquid within the motor chamber is not required. That may be accomplished, for example, by omitting piston 76 from pressure equalizing chamber 70, together with the associated springs 78 and 79, spring seat 72 and retainer 73. Live seals 67 and 68 can also be omitted. If active circulation of liquid through the air gap between rotor and stator is desired, apertures may be formed in stator shell 50 axially inward of the stator laminations to provide flow from passage structure 60 to motor chamber 30. Alternatively, shell 50 and seals 63 may be omitted, the central portion of housing shell 22 being formed as shown in FIG. 3A with internal fins 66a which support the stator laminations and define coolant passages 61a. Those passages are then in parallel with the air gap, providing useful flow through the air gap together with excellent heat exchange at the periphery of the stator.

An important further aspect of the present invention concerns the capability of the forepump to handle hot volatile liquids at very low values of the net positive suction head, such as may occur, for example, in aircraft at high altitudes in case of failure of the normal provision for pressurization. That capability is largely due to specific design features of the impeller, together with the previously described radial vanes 136 or their equivalent in inlet chamber 130.

FIG. 5 shows an illustrative impeller in partial axial elevation as seen from the inlet side, with annular inlet aperture 129 between hub 122 and the inner edge 177 of cover plate 128. Main impeller vanes are shown at 126, with secondary vanes at 126a. FIGS. 6 to 10 are sections taken in respective axial planes that differ progressively by 15 degrees, as indicated by the correspondingly numbered section lines in FIG. 5. Since there are four main and four secondary vanes in the present structure, uniformly spaced, the omitted half of each section is the same as that shown. The outer peripheries of impeller plates 124 and 128 are beveled at 167 and 168, providing essentially line seals with the cylindical wall 169 of the pump chamber. Liquid delivered radially outward from impeller passages 138 is therefore expelled through chamber 144 into conduits 145 (FIG. 6). It is noted, however, that the seal at plate 124 may be omitted if the chamber to the right of the impeller, as seen in the present structure, as final delivery chamber from the motor housing.

The present impeller includes structure, omitted for clarity in FIG. 1, at the impeller eye, that is, inward of cover plate 128, forming the annular surface 174 which virtually fills inlet aperture 129 and which may be considered an outward extension of hub 122. The spiral channels 176 are formed in that surface. At their inner ends at 175 adjacent hub 122, those channels are shallow and narrow, as shown at 176a in FIG. 6. Fifteen degrees later in FIG. 7 the channel 176b is deeper and wider, but with its radially inner side wall still at the periphery of the hub. In FIG. 8 at 176c the channel is again deeper and wider, and has shifted radially outward, with its outer side wall about half way across annular surface 174. That trend continues through FIG. 9 until the radially outer channel sidewall moves under the sharp edge 177 of cover plate 128, merging smoothly into a vane 126. At FIG. 10 channel 176e is still lateral-ly open to suction over about half its width, the other half being covered by plate 128 in the transition into a fully enclosed passage 138. At FIG. 10 the channel depth already corresponds to the full axial dimension of main impeller passages 138, and a new channel is about to start.

The gradual inclination of the channel bottom forms an axial ramp which controls the axial component of the motion of entering liquid. That ramp is inclined with respect to annular surface 174 at an angle less than 30° and typically about 10°. The radial lift angle of channels 176 is correspondingly small, typically of the order of 5 to 10°, increasing gradually outward to provide smooth merging into the sidewalls of the regular impeller vanes. The angle of those vanes at entrance, that is, the angle between the vane face and the tangential direction at cover edge 177, is made as small as feasible, typically between 10 and 15° and in any case less than 20°. Once the passages are fully enclosed, their direction departs progressively from the tangential direction, reaching an angle of the order of 30 to 40° at the impeller periphery, or from 2 to 3 times the entrance angle.

The effect of the described structure at the impeller eye is to cause liquid from outside the impeller to enter the gradually forming channel without any abrupt expansive dynamic forces. Liquid entering a conventional pump encounters the leading edges of the vanes at an appreciable angle of attack, experiencing correspondingly vigorous dynamic forces. In the present structure, liquid enters channels 176 laterally, rather than longitudinally, and at a low relative velocity controlled by the gentle axial ramp at the channel bottom. Further, the nearly tangential direction of the channels corresponds generally to a low angle of attack. Thus, liquid is received into the channels with susbtantially zero dynamic depression. Moreover, the liquid enters the steadily deepening and widening channels with essentially zero initial forward rotation, due to the restraining action of radial vanes 136 in entrance chamber 130. If the pump housing permits axial approach of entering liquid, those vanes are modified accordingly.

Once in the channels, the liquid is subject to strong frictional force from the channel walls of the rotating impeller. That friction accelerates the liquid in a generally tangential direction, increasing its energy without dynamic action. The pressure is thereby increased virtually without any tendency to cavitation. The sharp cutoff at 177 has been found effective in further reducing the required net positive suction head, perhaps by cleanly separating the energized channel liquid from the ambient chamber liquid. With increasing spinning movement of the liquid, centrifugal force generates further fluid pressure increase, allowing a gradual increase in blade lift and leading to normal pump action as the radius increases. The described impeller structure is thus able to pump hot liquids at a net positive suction head in the range of 1 to 3 feet without loss of capacity from cavitation.

In the present combination, the specially designed forepump permits input liquid to be received at pressures typically as low as 2 p.s.i.a., and delivers that liquid, after cooling of the motor, to the main pump at inlet pressures of several atmospheres. The main pump can therefore be designed for high performance without special attention to control of cavitation, and the combined motor and pump can operate at pressures below the range of conventional practice.

FIGS. 11 and 12 illustrate a modification which eliminates one of the live seals of FIG. 1, doubling the reliability of the motor with respect to that limiting component. The modification shown assumes an air-filled motor chamber 30a, but can be adapted for a filling of silicone oil or other liquid. Corresponding parts are denoted by the same numerals as in the previous embodiment. Liquid from main inlet 55 is supplied past vanes 136 to the eye of impeller 120, as before, is circulated from the forepump to passages 145, through the annular passage structure 60a around stator assembly 45, and through shaft passage structure 41a within rotor assembly 48. The liquid is then delivered through radial openings 106 into outlet chamber 100 and thence to main pump 34 via conduit structure such as that previously described.

The radial transfer of liquid between annular passage structure 60a and axial passage structure 41a occurs at the pump end of the motor, via the radial passages 80a. Those passages open inwardly into the annular header chamber 200 between shaft bearing 31 and live seal 67. The radial openings 202 in shaft 40a receive the liquid from that chamber. In both passage systems 41a and 60a provision is made for flow axially outward and then back, the forward and reverse annular passages 61a being circumferentially offset and the shaft passages being radially offset.

Annular passage structure 60a is preferably formed, like 60 of the previous embodiment, from a unitary extrusion 50a with ribs 66a which engage outer shell 22 and define individual axially directed passages 61a. End casting 24a includes a flange 206 between extrusion 50 and the delivery ends of passages 145 from the forepump. Liquid from the forepump is directed only into alternate ones of the annular passages 61a by openings 208 in flange 206 (FIG. 12). The peripheral channel 67 connects the various openings 208 for equalizing the flow. If the number of radial passages 145 is equal to the number of openings 208, channel 67 may be omitted. At the outer ends of passages 61a the liquid is returned through an adjacent one of the passages 61a, to which it is directed by a recess 210 in outer end casting 26. Each recess 210 bridges two adjacent passages 61a, as shown best in FIG. 12. Each return passage terminates at a radial passage 80a leading to chamber 200.

Coaxial sleeve 220 divides the interior of shaft 40 into radially inner and outer passage regions, the outer region terminating at its axially inner end where the shaft wall decreases in diameter and joins sleeve 220 at 221. Hence liquid from chamber 200 entering the shaft at 202 flows to the left in FIG. 11 outside sleeve 220, is blocked by the closed shaft end at 222, and returns to the right inside sleeve 220. That liquid is delivered into the shaft proper to the right of point 202, and leaves the shaft through either bypass 110 or openings 106 as in the previous embodiment. Heat transfer fins 82a extend radially outward from sleeve 220 and firmly contact the interior of the shaft throughout the length of rotor assembly 48, much as in the previous embodiment. Fins 82a may be formed with sleeve 220 as an integral extrusion in the manner previously described for fins 82 and their supporting solid core 83. The present system provides efficient heat exchange between the circulating liquid and both stator and rotor assemblies, but with the advantage that only the single live seal 67 is required.

The general configuration of FIGS. 11 and 12 can be adapted for operation with a captive liquid in motor compartment 30a by providing an equalizing chamber of the type shown in FIG. 1. One end of that chamber may communicate with electrical cable passage 52, as in FIG. 1, and the other end with one of the peripheral chambers or recesses 210, for example.

By employing a suitable silicone oil as captive liquid in the motor chamber excellent cooling is obtained, permitting operation of the motor at higher power levels than can be attained when the windings are contacted only by a gas. Yet the motor can be started readily at the very low temperatures, such as −65° F., for example, which are required for military aircraft. Such starting would be impossible if normal hydraulic fluid from the main pump circuit were admitted to the motor chamber.

I claim:
1. In a dynamoelectric motor that includes stator and rotor assemblies mounted within a motor housing for mutual rotation with respect to an axis and for mutual electrodynamic cooperation, the combination of
   structure on the motor housing for mounting a main liquid pump in driven relation to the motor,
   duct means in the motor housing for liquid flow in heat exchanging relation to the stator and rotor assemblies,
   inlet structure on the housing for admitting liquid to the duct means,
   outlet structure for supplying liquid from the duct means to the inlet of the main pump,
   said duct means, inlet structure and outlet structre accommodating the entire liquid flow to the main pump,
   and a centrifugal boost pump in the motor housing and driven directly by the motor, said boost pump being connected in series between the inlet structure and the duct means and acting to pressurize the entire body of liquid delivered to the duct means and therefrom to the inlet of the main pump.

2. The combination defined in claim 1, and including also
   structure within the housing forming a motor chamber containing the stator and rotor assemblies, said chamber being filled with a liquid having lower viscosity at normal temperature than the first said liquid,
   said rotor assembly being mounted on a shaft journaled on said axis and projecting from said motor chamber and is surrounded by said stator assembly,
   said duct means include generally annular passage means extending axially in heat exchanging relation to the stator assembly and substantially surrounding the motor chamber, axial passage means within the shaft in heat exchanging relation to the rotor assembly, and generally radial passage means interconnecting the annular and axial passage means outwardly of the motor chamber,
   and said boost pump includes an impeller mounted on the shaft outwardly of the motor chamber for receiving liquid from said inlet structure and delivering the liquid at elevated pressure to the annular passage means,
   said outlet structure communicating with the axial passage means outwardly of the impeller and being isolated from the boost pump.

3. In a dynamoelectric machine that includes structure forming a motor chamber, a shaft journaled on said structure and carrying a rotor assembly in the chamber, and a stator assembly rigidly mounted in the chamber for cooperating electrodynamically with the rotor assembly, the combination of:
   structure forming an end chamber at one end of the motor chamber and including a cylindrical peripherally apertured wall coaxial with the shaft,
   a pump impeller mounted on the shaft in the end chamber adjacent said wall aperture and dividing the end chamber into an inlet chamber adjacent the motor chamber and a second chamber remote from the motor chamber, the impeller including structure for receiving liquid from the inlet chamber and expelling it radially outward through the wall aperture,
   annular passage structure surrounding the motor chamber in heat exchanging relation with the stator assembly and commnicating at its inlet with the said wall aperture to receive liquid at elevated pressure from the pump,
   axial passage structure within the shaft in heat exchanging relation with the rotor assembly and opening at its outlet to said second chamber,
   passage structure interconnecting said annular and axial passage structures outside the motor chamber,
   inlet structure for admitting liquid into said inlet chamber,
   and outlet structure for conducting liquid from said second chamber.

4. In combination with an electric motor and a main liquid pump mounted in driven relation to the motor shaft, the pump having an inlet and an outlet and being subject to excessive cavitation at net positive suction head less than a critical value, a forepump mounted in driven relation to the motor and having an inlet and an outlet, inlet conduit structure for receiving the entire liquid flow for the main pump and for conducting said flow to the inlet of the forepump to be pressurized by the forepump, and cooling conduit structure arranged in heat exchanging relation with the motor for receiving liquid pressurized by the forepump from the forepump outlet and delivering such pressurized liquid, after absorbing heat from the motor, to the inlet of main pump, said forepump being capable of operating without excessive cavitation at net positive suction head less than said critical value, and delivering liquid through said cooling conduit structure to the main pump at net positive suction head exceeding said critical value.

5. The combination defined in claim 4, and in which said forepump comprises:

a centrifugal impeller mounted on the motor shaft and having laterally enclosed passages leading spirally outwardly from an impeller eye, housing structure in which the impeller is rotatably mounted and including fixed guide means for supplying entering liquid to the impeller eye essentially without forward rotation, said impeller including entrance structure adjacent the imepller eye for exerting on said entering liquid frictional force predominantly in a tangential direction to impart forward rotation to the liquid before it enters said passages.

References Cited

UNITED STATES PATENTS

| | | | |
|---|---|---|---|
| 3,135,211 | 6/1964 | Pezzillo | 310—54 XR |
| 2,923,461 | 2/1960 | Dallenbach | 310—63 XR |
| 3,060,335 | 10/1962 | Greenwald | 310—54 |
| 3,007,065 | 10/1961 | Rigney | 310—54 |
| 1,803,570 | 5/1931 | Uggla | 310—62 |
| 3,289,595 | 12/1966 | Bach | 310—54 XR |
| 2,784,672 | 3/1957 | Wallace | 310—54 XR |
| 3,188,833 | 6/1965 | Robinson | 310—61 XR |
| 3,107,626 | 10/1963 | Thoren et al. | 310—63 XR |
| 3,241,331 | 3/1966 | Endress et al. | 310—54 XR |
| 3,318,253 | 5/1967 | Campolong | 310—54 XR |

MILTON O. HIRSHFIELD, Primary Examiner

B. A. REYNOLDS, Assistant Examiner

U.S. Cl. X.R.

103—53, 96; 310—59, 63